G. W. TOLHURST.
Corn Sheller.
No. 25,688.
Patented Oct. 4, 1859.
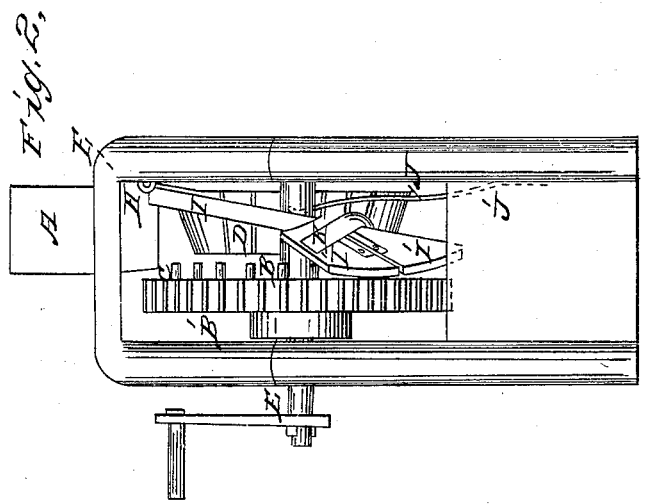
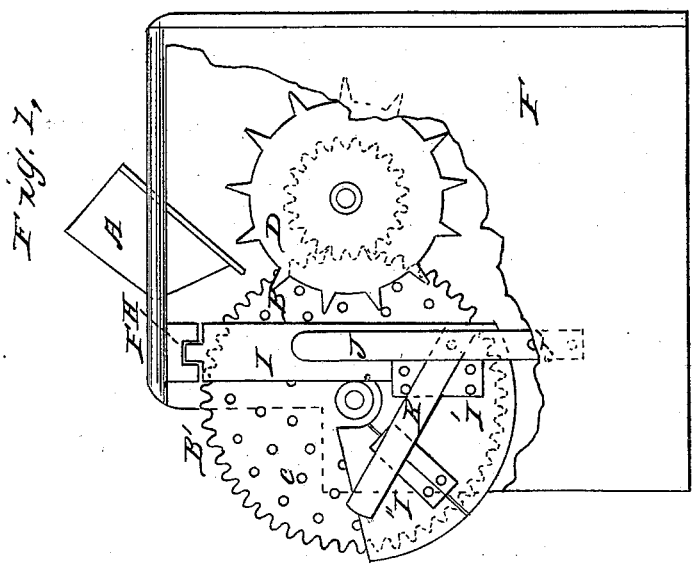
Witnesses:
James Kynn
George Tolhurst
Inventor:
Geo. W. Tolhurst

UNITED STATES PATENT OFFICE.

GEORGE W. TOLHURST, OF LIVERPOOL, OHIO.

CORN-SHELLER.

Specification of Letters Patent No. 25,688, dated October 4, 1859.

*To all whom it may concern:*

Be it known that I, GEORGE W. TOLHURST, of Liverpool, in the county of Medina and State of Ohio, have invented a new and useful Improvement in Machines for Shelling Corn from the Cob; and I do hereby declare that the following is a full and exact description thereof, reference being had to the accompanying drawings and to the letters of reference marked thereon.

The nature of my invention will be understood by the following specification and claim.

To enable others skilled in the art to make and use my invention I will proceed to describe its construction and operation. I construct my machines in any of the forms known as the toothed disk corn shellers. To the toothed side of said disk I apply a flexible apron which extends about one third of the surface of said disk and is placed in a manner so as to cause the cob to be separated from the corn as soon as it is shelled and carried off in one direction while the corn is thrown in another, and thus preventing the cob and corn from being mixed up together which would otherwise be the case.

I will now describe my invention with reference to the drawings and the letters marked thereon, Figure 1, being a side elevation showing the interior Fig. 2 being an end view showing the interior.

The corn to be shelled is thrown "end first" into the spout marked A, when it passes down the spout it comes in contact with the revolving disk, B, said disk is provided with teeth, marked C, said teeth give the cob a rotating movement while the corn is being shelled from it by the flanges of the disk wheel marked, D, said disk wheel having an accelerated motion given it by means of the cogs on the periphery of the disk as shown at B', the whole being set in motion by means of the crank and shaft, E, attached to the frame F.

At, H, is a hinge which supports the flexible apron marked I said apron being made flexible by means of the hinges, I', and, I''.

J, is a spring one end of which is secured to the frame at, J', the other end presses against the upper part of the piece that supports the flexible apron causing said apron to adjust itself to the size of the cob and yet press said cob sufficiently hard against the teeth of the disk, B, to bring said cob around to the terminus of the apron where it is thrown out.

K, is a spring which keeps the outer end of the apron to the disk wheel by which means a small cob will be thrown out of the machine, even if a larger cob is entering the other end of the apron.

Having thus described my improved shelling machine what I claim as new and desire to secure by Letters Patent, is—

The flexible hinged apron in combination with the disk, B, and flange wheel, D, when the several parts are constructed and arranged for operation in the manner described, for the purpose specified.

GEORGE W. TOLHURST.

Witnesses:
 JAMES KYSER,
 GEORGE TOLHURST.